(12) United States Patent  
Akemakou

(10) Patent No.: US 7,701,104 B2  
(45) Date of Patent: Apr. 20, 2010

(54) DOUBLE-EXCITATION ROTATING ELECTRICAL MACHINE FOR ADJUSTABLE DEFLUXING

(75) Inventor: Antoine Dokou Akemakou, Vitry-sur-Seine (FR)

(73) Assignee: Valeo Equipements Electriques Moteur, Creteil (FR)

( * ) Notice: Subject to any disclaimer, the term of this patent is extended or adjusted under 35 U.S.C. 154(b) by 815 days.

(21) Appl. No.: 10/524,481

(22) PCT Filed: Aug. 13, 2003

(86) PCT No.: PCT/FR03/02522

§ 371 (c)(1),
(2), (4) Date: Oct. 14, 2005

(87) PCT Pub. No.: WO2004/017496

PCT Pub. Date: Feb. 26, 2004

(65) Prior Publication Data

US 2006/0119206 A1    Jun. 8, 2006

(30) Foreign Application Priority Data

Aug. 14, 2002    (FR) .................................. 02 10345

(51) Int. Cl.
*H02K 21/00*    (2006.01)
(52) U.S. Cl. ........................................ 310/181; 310/168
(58) Field of Classification Search ................ 310/181, 310/168
See application file for complete search history.

(56) References Cited

U.S. PATENT DOCUMENTS

| 4,011,479 | A | * | 3/1977 | Volkrodt ..................... 310/186 |
| 4,745,312 | A | * | 5/1988 | Nagasaka .................. 310/49 R |
| 5,663,605 | A | * | 9/1997 | Evans et al. ................. 310/181 |
| 5,693,995 | A | * | 12/1997 | Syverson ..................... 310/114 |
| 5,747,909 | A | * | 5/1998 | Syverson et al. ....... 310/156.56 |

(Continued)

FOREIGN PATENT DOCUMENTS

EP    0707374 A1    4/1996

(Continued)

OTHER PUBLICATIONS

Luo et al.: "A Synchronous/permanent magnet hybrid AC machine"; IEEE Transactions on Energy Conversion, vol. 15, No. 2, Jun. 2000; pp. 203-210.

*Primary Examiner*—Quyen Leung
*Assistant Examiner*—Naishadh N Desai
(74) *Attorney, Agent, or Firm*—Osha • Liang LLP

(57) ABSTRACT

The invention concerns a rotating electrical machine comprising a stator enclosing a rotor including permanent excitation magnets (20, 24, 26, 30) capable of producing magnetic fluxes, and excitation coils (22, 28), capable of being excited or not and generating flux constituents which can counter the fluxes generated in the magnets, wherein the number (Na) of magnets and the number (Nb) of excitation coils as well as the mutual arrangement of the coils and the magnets relative to one another from an elementary pattern (me), said numbers Na of magnets, Nb of coils and Nme of elementary patterns capable of being modified depending on the desired basic intensity (Ibase) in the machine, said basic intensity being determined when the coils are not excited and on the desired modulation intensity (Imod) in the machine, said modulation intensity being determined when the coils are excited.

17 Claims, 3 Drawing Sheets

U.S. PATENT DOCUMENTS

| | | | |
|---|---|---|---|
| 5,753,989 A * | 5/1998 | Syverson et al. | 310/114 |
| 6,072,257 A * | 6/2000 | Akemakou | 310/191 |
| 6,147,429 A * | 11/2000 | Akemakou et al. | 310/181 |
| 6,236,134 B1 * | 5/2001 | Syverson | 310/181 |
| 6,271,613 B1 * | 8/2001 | Akemakou et al. | 310/181 |
| 6,509,664 B2 * | 1/2003 | Shah et al. | 310/181 |
| 6,512,318 B2 * | 1/2003 | Torok et al. | 310/181 |
| 6,784,586 B2 * | 8/2004 | Akemakou | 310/194 |
| 6,847,143 B1 * | 1/2005 | Akemakou | 310/156.43 |
| 6,972,504 B1 * | 12/2005 | Hsu | 310/156.56 |
| 2005/0248229 A1 * | 11/2005 | Even et al. | 310/180 |

FOREIGN PATENT DOCUMENTS

| | | |
|---|---|---|
| EP | 0741444 A1 | 11/1996 |
| EP | 741444 A1 * | 11/1996 |
| EP | 0942510 A1 | 9/1999 |
| FR | 2787645 A1 * | 6/2000 |
| FR | 2787646 A1 * | 6/2000 |
| FR | 2856532 A1 * | 12/2004 |
| WO | WO 9967871 A1 * | 12/1999 |
| WO | WO 00/38298 A1 * | 6/2000 |
| WO | WO 00/38301 A1 * | 6/2000 |
| WO | WO 00/57534 A1 * | 9/2000 |

* cited by examiner

DOUBLE-EXCITATION ROTATING ELECTRICAL MACHINE FOR ADJUSTABLE DEFLUXING

AREA OF THE INVENTION

The invention concerns a double-excitation rotating electrical machine to allow adjustable defluxing, i.e. control of the power provided by the machine that is not necessarily maximum. This rotating electrical machine may be an alternator or an alternator-starter for automobiles.

Generally, the invention has applications in all areas that require the generation of electricity and, in particular, in the automobile sector to generate electricity in the onboard network of vehicles with thermal motors or hybrid vehicles.

STATE OF THE TECHNOLOGY

Single-phase or polyphased alternators and alternator-starters of conventional automobiles contain, as described for example in document EP-0515 259, a stator, inside of which a rotor with clamps equipped with an excitation coil powered by brushes in contact with two generator slip rings is installed on a projecting section of the rotor shaft.

The brushes are connected to a voltage regulator controlling the voltage of the excitation coil. The electric power of the excitation coil of the rotor magnetizes the rotor and creates magnetic fluxes that pass around the strands of the armature coil that are housed in the notches of the magnetic structural core of the stator. These magnetic fluxes generate an induced current in the armature coil of the stator and, therefore, electric power in the machine. With such a rotor, the power produced is zero when the electric current in the excitation coil is zero, but the level of power than can be provided by such a machine is limited by its electromagnetic design.

To improve the efficiency of the machine, it is known, in document EP-803962 for example, how to achieve the excitation fields of the rotor with permanent magnets.

This arrangement, in which the rotor has only permanent magnets for excitation, limits the operation of the machine because it is not possible to adjust the excitation of the rotor.

Rotating electrical machines solve the technical problems discussed above. These machines, described in document U.S. Pat. No. 563,605 for example, have rotors that include both permanent magnets and excitation coils. The permanent magnets are said to be surface because they are installed circumferentially on the exterior periphery of the rotor to produce a radial flux. In this case, we speak of mixed excitation or even double excitation. Such rotors, placed on machines that have high numbers of poles, increase the performances obtained with the previous machines. They also reduce, even cancel, the magnetic flux produced by the magnets and, therefore, the power produced by the machine. Thus, the electric machine can provide only the electric power necessary to the automobile onboard network.

In such machines, the current delivered is controlled using switching equipment at the level of the excitation coils. This switching equipment selectively inverts the direction of the excitation of the coils in order to reduce or cancel the flux from the magnets. This switching equipment consists of a semi-conductor switching bridge, called an H-bridge. Such an H bridge has the disadvantage of a high cost.

To solve this cost problem, a machine was built in which the power delivered by the electrical machine varies by injecting into the excitation coils of the rotor with permanent magnets a single-directional current that evolves between a value that is essentially zero and a maximum value that delivers respectively a limited energy and a maximum energy. Such a machine is described in patent application EP-A-0 942 510 filed in the name of the applicant.

FIGS. 1a and 1b show a method for fabricating a mixed rotor 200 described in document EP-A-0 942 510, which includes surface permanent magnets with a radial flux on its exterior periphery.

This rotor, here in annular form, has twelve poles 1 to 12, three of which with permanent magnets 1, 5 and 9, three poles with coils or excitation coils 3, 7 and 11, and six poles with reluctance 2, 4, 6, 8, 10 and 12. The reluctance poles are the intermediate poles through which the magnetic fluxes emitted by the magnets and/or the poles with excitation coils circulate. These poles with excitation coils are each delimited by two notches inside each of which is a wire, a copper wire for example, wound around the pole in question to form the excitation coil with interposition of an insulator. Here, these projecting poles each have, on the outside periphery, an enlarged head for forming retention collars for the associated excitation coil. The poles with permanent magnets are delimited circumferentially, at each of their circumferential ends, by a shallow empty notch. The poles with permanent magnets each have at least one housing that is circumferentially oblong in shape for mounting a permanent magnet. As described above, the magnets are surface and are mounted near the exterior periphery of the rotor to produce a radial magnetic flux.

The poles with reluctance each offer the advantage of having, at their exterior periphery, a circumferential projection directed toward the adjacent excitation coil pole to radially retain the excitation coil.

Two poles with reluctance are installed on either side of a pole with a permanent magnet, while a pole with an excitation coil is mounted between two consecutive reluctance poles.

For simplicity reasons, the poles with excitation coils will also be referred to hereinafter as the coil poles and the permanent magnet poles will be referred to as the magnet poles.

When they are not excited or activated by the passage of an electric current, the coil poles react like reluctance poles, i.e. they have no effect on the direction of the magnetic fluxes emitted by the permanent magnets. In this case, the magnetic polarities observed in the rotor are those noted on FIG. 1a, i.e. S (South) for the magnet poles and N (north) for the other poles. We thus obtain, when the coils of the machine are not excited, patterns called elementary patterns that are SNNN SNNN SNNN for a machine with 12 poles. Thus, when the machine is not excited, each magnet produces two magnetic fluxes F3, which are each divided into two magnetic fluxes F1 and F2 toward, first, the reluctance poles 2, 4, 6, 8, 10 and 12 and, second, toward the coil poles 3-7 and 11 that are not excited and behave like reluctance poles.

Referring to document DP 0942 510 cited above, we will note that the rotating electrical machine has a polyphased stator equipped with a core made of magnetic material, also called a yoke frame, which is equipped with notches, preferably semi-closed, on the internal periphery of the stator, which receive the strands of the armature coils in the stator.

These notches are separated from each other by teeth, also called poles. The fluxes F1 to F3 cited above pass through the teeth of the stator, with a small air gap between the stator and the rotor.

When excitation coils or windings, also called coils for purposes of simplicity, are excited (FIG. 1b), they each generate a magnetic flux FD, which opposes the propagation of the magnetic fluxes F2 of the magnets toward the coil poles that are located between the two strands of the same coil, while on the other hand, this magnetic flux FD, created by the coils. strengthens the flux F1 which moves from each magnet toward each of the reluctance poles that frame each coil pole or magnet coil. Thus, we understand, when the coils are activated by passage of an electric current, they present a South pole, while they present a North pole when they are not excited and vice-versa. Therefore, the poles of the rotor will adopt a magnetic configuration NSNSNSNSNSNS which ensures a transfer of energy to the stator, which increases progressively with the excitation current in the coils.

In this way, as in all currently known double excitation machines, the rating is determined as a function of the magnets and, more specifically, of the size, type, number and location of the magnets in the machine. The rating (called Ibase below) is the level of the basic power that the machine can provide only with the permanent magnets, i.e. when the coils are not excited. For example, such a machine can provide, in alternator mode, a basic amperage of 45 amps.

When the coils are activated or excited by the passage of an electric current, then the total electric power provided by the machine increases in relation to the power supplied by the magnets alone. If the magnets alone provide, for example, 45 amps, then the total amperage supplied by the machine will be, for example, 90 amps.

This characteristic, which consists of being able to control the power supplied by the machine, is called defluxing. This defluxing can be controlled as a function of the rotation speed of the rotor. In the machines that have just been described, the magnetic flux produced in the rotor can either be reduced sharply or canceled completely depending on the values and directions of the currents supplied to the excitation coils of the rotor. When defluxing increases the power supplied by the machine in relation to the power supplied only with the magnets, then there is positive defluxing. In the opposite case, there is negative defluxing.

Thus, these machines can produce power that may vary between a basic power produced by the magnets alone and a maximum power produced by the magnets and the coils When a machine has a device like the H bridge described above to invert the excitation current of the rotor coils, then the power produced may vary between zero or almost zero and a maximum value; these two values are located on either side of the basic power produced by the magnets alone.

However, depending on the applications, it is interesting to be able to have different structures in which the basic power produced by the magnets alone can be adjusted.

Thus, to achieve a correct rating for the machine, the choice of the number of the magnets becomes an important criteria in providing the basic power needed by the application, at the average rotation speed of the machine desired, without injecting current into the excitation coils in order to optimize yield.

DESCRIPTION OF THE INVENTION

The purpose of the invention is to correct, simply and economically, the problems described above.

One purpose of the invention is to propose double excitation rotor structures in which the basic power produced can be modulated.

To achieve this, the rotor has poles with permanent magnets and poles with excitation coils, placed in such a way to create a specific elementary pattern that can be reproduced several times on the rotor. In other words, in the invention, the number of magnets and the number of excitation coils, as well as their respective locations and the number of elementary patterns, can be modified as a function of the basic power desired in the machine.

More specifically, the invention concerns a rotating electrical machine that contains a rotor with a core of magnetic material, a stator surrounding the rotor; the stator has at least one armature coil housed in notches made in the magnetic core presented by the stator, and the rotor is equipped with devices to selectively establish closed magnetic circuits passing around the armature coil; these devices include:

permanent excitation magnets able to establish magnetic fluxes that have, depending on the direction of displacement of the rotor, components in opposite directions; and excitation coils housed in notches in the rotor, able to be excited and to generate magnetic flux components opposing the magnetic fluxes generated in the magnets.

The machine of the invention is characterized by the fact that the number (Na) of permanent magnets, and the number (Nb) of excitation coils, and the arrangement of the coils and magnets in relation to each other form an elementary pattern; this elementary pattern can be repeated a number (Nme) of times; these numbers Na of magnets, Nb of coils and Nme of elementary patterns can be modified as a function, first, of the basic intensity desired in the machine (this basic intensity is determined when the coils are not excited) and, second, a desired modulation intensity in the machine (this modulation intensity is determined when the coils are excited).

Preferred aspects (but not limited to these aspects) of the machine according to the invention are as follows:

Na is equal to or greater than 1, Nb is equal to or greater than 1, Nme is equal to or greater than 1, and the number pair Na, Nb is different from 1.1.

The magnets Na with the same elementary pattern are arranged to generate a radial magnetic flux.

The magnets with the same elementary pattern have the same polarity.

The coil poles with the same elementary pattern have the same polarity.

Within an elementary pattern, at least two consecutive magnets are separated by at least one reluctance pole.

Within an elementary pattern, at least two consecutive coil poles are separated by at least one reluctance pole.

Within an elementary pattern, at least one consecutive coil pole and one magnet are separated by at least one reluctance pole.

The coil strands of a coil in an elementary pattern are housed in two adjacent notches placed between two consecutive magnets.

Several elementary patterns are associated with each other.

The elementary patterns are different.

Between at least two consecutive elementary patterns, a succession of at least one pair of North-South or South-North poles created by at least one magnet is inserted.

At least one magnet inserted between two consecutive elementary patterns is different in polarity from at least one magnet belonging to at least one elementary pattern.

The Nb coils are not all excited simultaneously.

The modulation intensity (Imod) is within an interval between −Ib and +Ib, where Ib is the maximum magnetic amperage supplied by the Nb coils.

A residual magnetic flux (Fr) persists, which comes from magnets not subject to the influence of the defluxing magnetic flux (Fd) produced by the excitation coils.

DETAILED DESCRIPTION OF PREFERRED METHODS FOR FABRICATING THE INVENTION

Figure 1A:
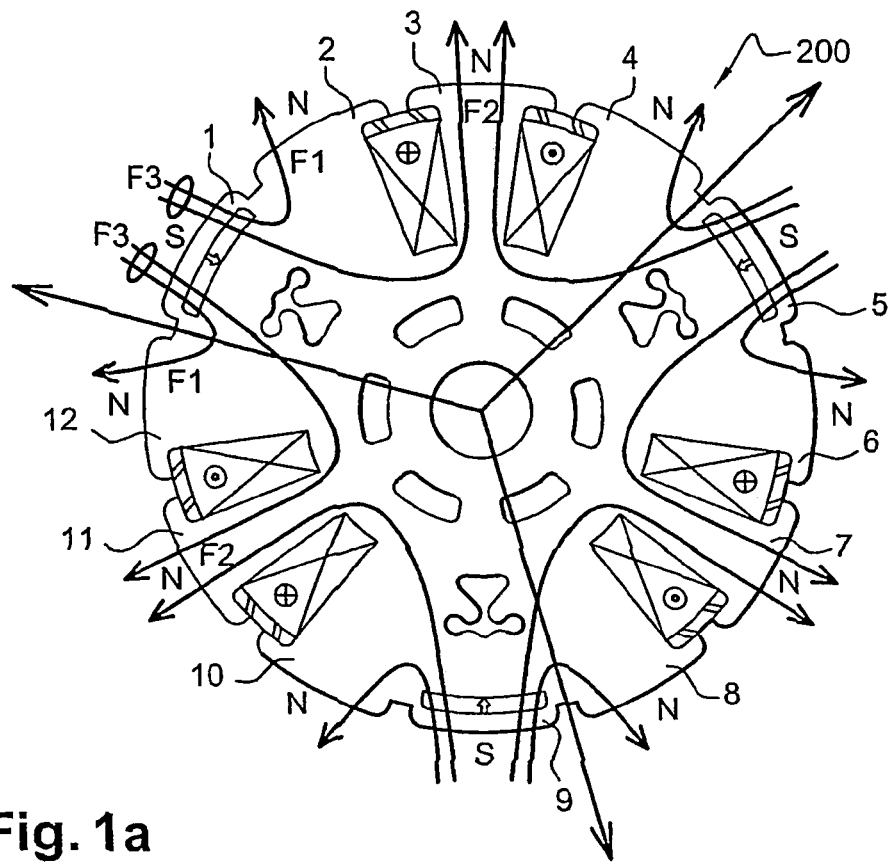
FIGS. 1a and 1b, already described, are cross-section schematic views of an example of a machine with twelve poles in accordance with prior art, in a state of non-excitation of the excitation coils and in a state of excitation of the coils respectively.
Figure 1B:
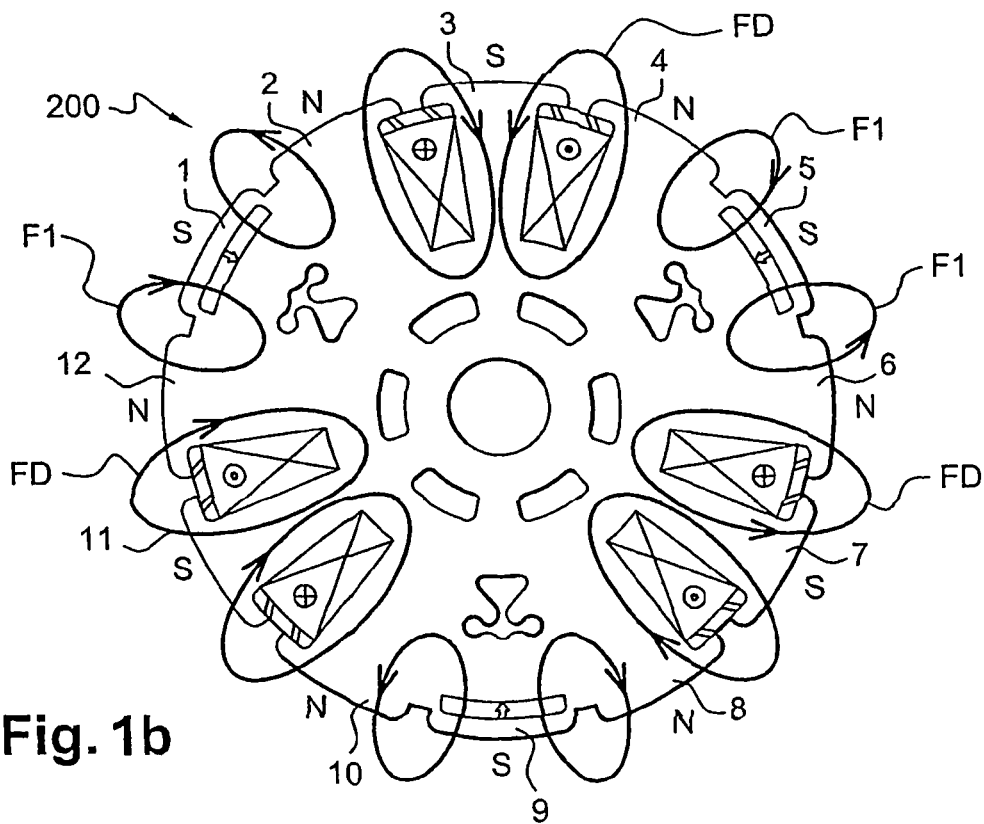
Figure 2:
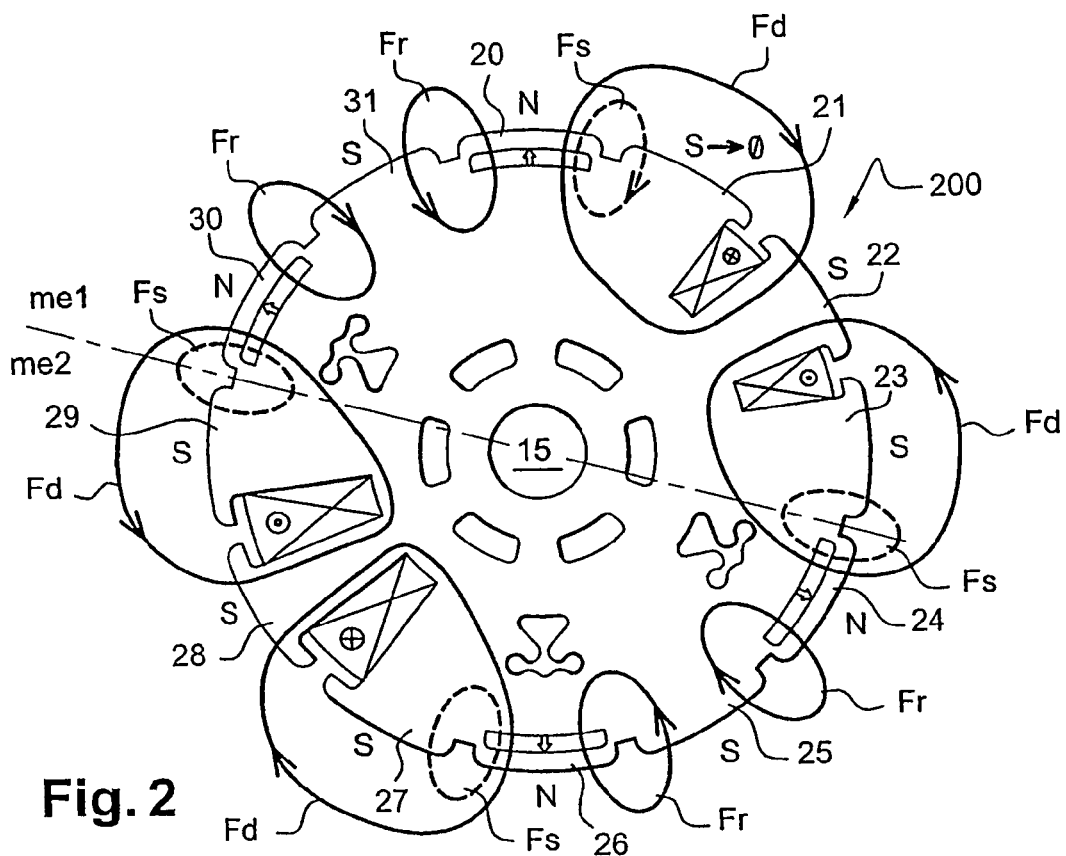
FIG. 2 is a cross-section view of a first example of fabrication of a machine with twelve poles according to the invention.
Figure 5:
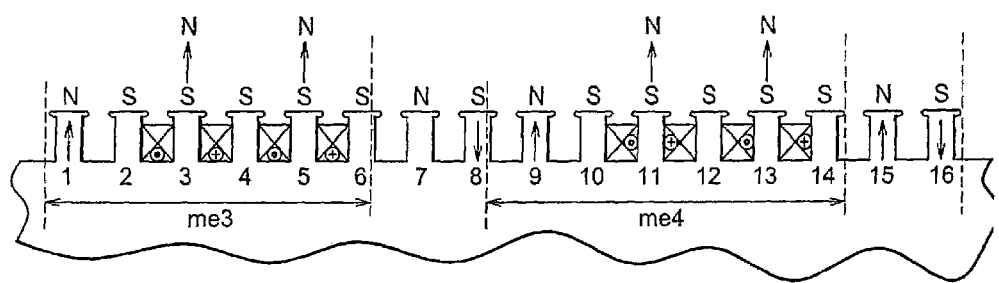
FIG. 5 schematically shows a variant for fabrication of the invention, with development of the rotor section of a machine according to FIG. 3.

In FIGS. 2 and 5, N and S are used, as in FIGS. 1a and 1b, to designate a North pole and a South pole respectively.

The invention concerns a double excitation rotating electrical machine, in which it is possible to modulate the basic power emitted by the magnets only, as well as the defluxing.

The basic power is provided by the permanent magnets only, i.e. when the excitation coils or windings are not powered electrically. This basic power corresponds to the rating of the machine. It depends on the number of magnets in the machine and also on the positioning of the magnets in the rotor (radial, orthoradial, etc.).

The invention proposes modulating the basic power by playing on the number of magnets, the number Nb of coils, and a number Nme of elementary patterns. Preferably, Na is equal to or greater than 1, Nb is equal to or greater than 1, Nme is equal to or greater than 1, and the pair of numbers Na, Nb is different from 1.1. An elementary pattern is a set of magnets and coils associated with a specific order and distributed over all or part of the contour of the rotor. An elementary pattern can be repetitive, i.e., it can be associated with one or more other identical elementary patterns. An elementary pattern can also be associated with one or more other different elementary patterns.

The basic power, called Ibase, varies as a function of the number of magnets Na in each elementary pattern and the number Nme of elementary patterns on the contour of the rotor. Thus, by modulating the number of magnets in an elementary pattern, and by modulating the number of elementary patterns, it is possible vary the basic intensity of the machine.

The power of modulation, called Imod, depends on the number of coils Nb and the number Nme of elementary patterns present on the contour of the rotor. Thus, by modulating the number of coils in an elementary pattern and by modulating the number of elementary patterns, it is possible to vary the modulation intensity of the machine. We understand that the larger the number of poles of the rotor, the more elementary patterns possible and, therefore, the more values possible for the basic intensity and the modulation intensity.

According to the invention, it is possible to associate several elementary patterns with each other, i.e. to place several different or similar elementary patterns next to each other on the contour of the rotor. Thus, according to the invention, the configuration of the rotor will be such that the negative or positive defluxing created by the coil poles or excitation coil poles will be partial or total.

FIG. 2 shows a rotor example according to the invention. This rotor has two poles distributed in two elementary patterns; each elementary pattern has two magnet poles and one coil pole. In the center of the rotor, we have shown the rotation shaft 15 integrated with the rotor which has, for this purpose a body made of magnetic material integrated with this shaft.

In this example, the rotor has two identical elementary patterns me1 and me2. In other words, Nme=2

The elementary patterns me1 and me2 have a first permanent magnet pole 30, 24 followed by a first reluctance pole 31, 25, a second magnet pole 20, 26, a second reluctance pole 21, 27, a coil pole 22, 28 and, finally, a third reluctance pole 23, 29. Therefore, Na=2 and Nb=1. Thus, within an elementary pattern, two consecutive magnets are separated by at least one reluctance pole. Likewise, within an elementary pattern, one coil pole and one magnet pole are separated by at least one reluctance pole.

Here, the first and second magnet poles are identical and similar to the poles 1 in FIG. 1a.

The second and third reluctance poles are similar to the poles 2 and 4 in FIG. 1a, so that the coil pole is similar to the one in FIG. 1a.

The first reluctance pole is delimited circumferentially on its external periphery by two shall empty notches of the same type as those in FIG. 1a.

Thus, the magnets are oriented to provide a North radial polarity. When the coils are not excited or activated, the polarities of the elementary pattern are: NSNSSS. When the coils are excited positively, we then obtain the following succession of magnetic poles—NSNSNS, with the coil pole shifting from a South polarity to a North polarity. In this case, the defluxing is positive and the power supplied is greater than the basic power provided by the magnets alone. In this example, the two patterns me1 and me2 are identical, placed circumferentially one after another.

FIG. 2 represents a first example of fabrication of the invention in negative defluxing mode, in which the coils are activated by an excitation current circulating in the opposite direction. Thus, the coil poles remain South poles and generate a defluxing magnetic flux Fd that cancels a portion of the flux (Fs) emitted by the magnets closest to this coil pole.

However, these coil poles cannot eliminate another part of the flux (Fr) of these same magnets closest to the first reluctance poles 25, 31. The negative defluxing will not be total, but the residual power will, however, be clearly less than that obtained in the absence of power to the excitation coils.

Thus, according to the first fabrication method, we obtain partial negative defluxing of the rotor. In effect, certain magnets cannot be defluxed by any of the excitation coils of the rotor powered inversely because of their distance. These distant magnets cannot be reached by the coil poles, or are partially reached, so that a residual magnetic flux Fr remains that is weaker than the basic flux emitted by all the magnets, in the absence of excitation.

Such a machine will not generate total negative defluxing through excitation coils and will have advantageous applications in which we very often use about ⅔ of the maximum power of the machine corresponding to quasi-zero excitation for this power.

Figure 3:
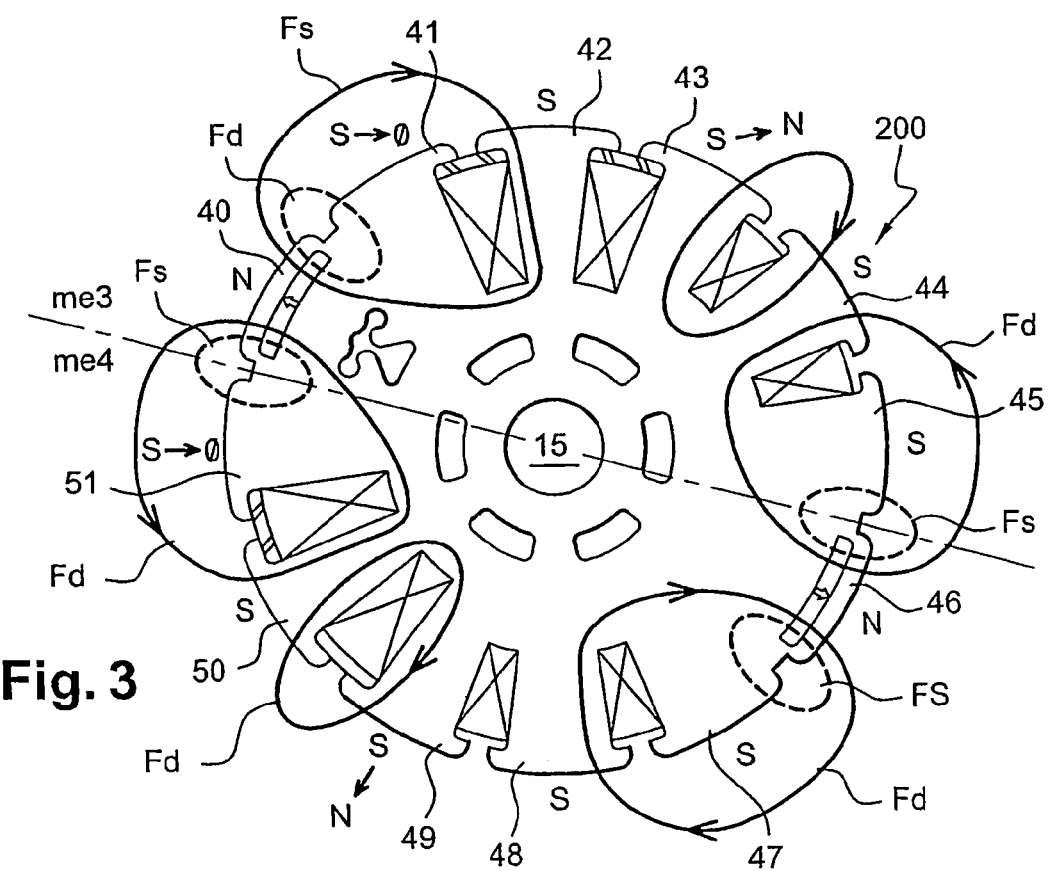
FIG. 3 is a view analogous to FIG. 2 for a second example of fabrication of a machine with twelve poles according to the invention.

FIG. 3 shows a second example of a rotor according to the invention. This rotor has twelve poles distributed in two identical elementary patterns me3 and me4, each of which has a magnet pole and two coil poles. Thus, in this example, Na=1, Nb=2 and Nme=2. The elementary patterns me3 and me4 have, first, a magnet pole 40, 46 following by a first reluctance pole 41, 47, then a first coil pole 42, 48, a second reluctance pole 43, 49, a second coil pole 44, 50, and a third reluctance pole 45, 51. Thus, within an elementary pattern, two coil poles are separated by at least one reluctance pole. Likewise, within an elementary pattern, a coil pole and a magnet pole are separated by at least one reluctance pole The poles 40, 46 are similar to poles 20, 30, 34, 26 of FIG. 2, while the reluctance poles are similar to those in FIG. 1*a*.

When the coils are not excited, the polarities of the elementary pattern are: NSSSSS-NSSSSS for a rotor with 12 poles. When all the coils are positively activated, the polarities become: NSNSNS and the machine supplies power greater than the basic power provided by the magnets alone In this example, the number of magnets Na is less than the number of coils Nb.

In negative defluxing mode, when the activation current of the coil poles is reversed, the configuration of the rotor becomes N0SNS0-N0SNS0 because, under the influence of the coil poles in reverse:

the reluctance poles 43 and 49 of FIG. 3 are reversed;

the reluctance poles 51-41-45 and 47 are no longer magnetically operational.

This fabrication example shows another way to create a partial negative defluxing while all the magnets may be submitted completely to the magnetic flux of the coil poles.

As explained previously, it is possible, in certain applications, to combine several elementary patterns. It is possible, for example, to place me1 and me3 of FIGS. 2 and 3 side by side on the contour of the rotor.

In the examples in FIGS. 2 and 3, the magnets supply a North polarity shown by an arrow within the magnet so that the magnetic flux is directed radially toward the external periphery of the rotor. All the polarities of these two examples may be reversed by modifying the direction of the magnets so that they have a South polarity as in FIGS. 1*a* and 1*b*.

By modulating the number of poles on the rotor, we can modify the firing speed and by modulating the numbers Na of magnets, Nb of coils and Nme of patterns, one controls the defluxing of the rotor.

All these modulations may be made based on predefined criteria, such as the type of motor to be powered, the number of electric devices, the electric consumers on the vehicle, and the desired safety features (no overheating of the battery, etc.).

These modulations can also be made as a function of the size of the rotor. In effect, in certain cases where the size of the rotor is limited, it is not possible to have, for example sixteen poles but only twelve, or even fewer; in this case, it is interesting to have more magnets than coils or a specific distribution of the magnets and coils, because a coil takes up more space than a magnet. On the other hand, a magnet has a higher cost price than a coil. Therefore, the greater the number of magnets in an elementary pattern, the higher the cost price of the rotor.

Advantageously, to obtain a more precise defluxing, all the coils belonging to the same elementary pattern, as shown for example in FIG. 3, are not powered simultaneously. In particular, one coil out of two is powered. Thus, it is possible to adjust the negative or positive defluxing in the application; this defluxing can be total or partial. In another variant, it is possible to activate only the excitation coils that belong to some of the elementary patterns of the rotor.

Figure 4:
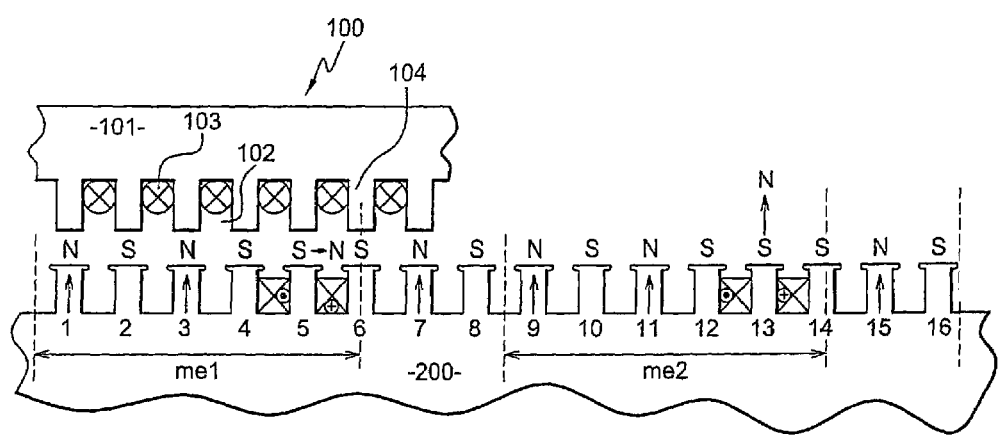
FIG. 4 shows schematically a variant for fabrication of the invention, with development of the rotor section of a machine according to FIG. 2.

According to another fabrication method, we insert between two consecutive elementary patterns a succession of magnetic poles N-S or S-N created by at least one magnet, for example, with a radial effect as shown in FIGS. 4 and 5.

Thus, FIG. 4 illustrates a variant of FIG. 2 in which two South-North poles are inserted at the level of the poles 7,8 and 15,16 between the elementary patterns me1 and me2, formed respectively by the poles 1 to 6 and 9 to 16. Thus, by adding two additional magnets, one can move easily from a rotor with 12 poles to a rotor with 16 poles. These two additional magnets allow adjusting the basic power without excitation of the machine, while preserving these positive and negative defluxing capacities. Clearly, the magnetic poles added between two elementary patterns must be arranged advantageously in order to obtain a succession of NSNSNS poles when the excitation current is positive in order to obtain maximum output power.

In the same way, FIG. 5 illustrates another fabrication example of the variant fabricated using the method in FIG. 3. Thus, we inserted two North-South magnetic poles between the two elementary patterns me3 and me4 at poles 7 and 8 and 15 and 16. As shown in FIG. 5, these magnets inserted between two elementary patterns can have a polarity different from the magnets in the elementary patterns. Likewise, the magnets inserted between the elementary patterns may also have reserve polarities.

It is also possible to insert additional North-South poles only between certain elementary patterns. Likewise, several inserted North-South poles may be contiguous. Thus, a rotor with mixed excitation can have, between at least one elementary pattern, at least one North-South pole created by at least one magnet, the polarity and position of which advantageously allows the electrical machine to produce a maximum power during positive defluxing.

As shown in FIG. 5 at the level of the poles 15 and 16, and applicable to any other arrangement of elementary patterns, a North-South pole inserted between at least one elementary pattern can be formed by two contiguous magnets with reverse polarities. This arrangement is a variant of the inserted north-south poles described above which are formed by one magnet pole and one reluctance pole Thus, as clearly shown by the description, the rotor 200 has a body made of magnetic material and is equipped, first, with notches to hold the excitation coils and, second, with housings for mounting permanent magnets. The notches are grouped in pairs to delimit the projecting poles 22, 28, 42, 43, 44, 48, 49, 50 around which electric wires, made of copper for example, are wound to form excitation coils.

For example, the body of the rotor is made in the form of a packet of plates with holes in the center for forced fitting on the shaft 15 advantageously knurled for this purpose. The aforementioned notches and housings are easily fabricated by cutting. Passages are made underneath at least one magnet (FIGS. 2 and 3) for the passage of assembly elements, such as tie rods or plates.

The excitation coils are oblong in shape axially.

Note the presence of openings (not referenced) near the shaft 15 (FIGS. 2 and 3) to channel the magnetic fluxes and form closed magnetic circuits also circulating in the stator of the machine described below.

Here, the housings of the magnets extend to the external periphery of the rotor and globally have a rectangular shape, the lengths of which are perpendicular to a radius of the rotor. Advantageously, the magnets have a shape that complements their housings which are, as described above, surface housings to generate radial magnetic fluxes.

Of course, other arrangements to create radial magnetic fluxes are possible.

As partially visible on FIG. 4, the rotating electrical machine has, as described above, a stator 100 that surrounds, at least partially, the rotor 200 and is equipped with a body 101 made of magnetic material, in the form of a packet of plates for example. This stator 100 is advantageously polyphased and thus has armature coils 103 mounted in notches 102 made in the body 101. The notches 102 are delimited by teeth 104 which receive the magnetic flux emitted by the rotor which passes through a small, annular air gap present between the external periphery of the rotor and the internal periphery of the stator. This is why the magnetic flows are shown by loops.

The permanent magnets consist, for example, of ferrites or rare earths or a combination of the two.

The electrical machine is, in one form of fabrication, an automobile alternator that transforms the mechanical energy into electrical energy; its stator is an armature stator and the rotor is an inductor rotor. In a variant, which is known, the alternator is reversible and is, therefore, configured to form an electric motor that starts the thermal motor of the automobile vehicle. This type of alternator is called an alternator-starter.

The invention claimed is:

1. A rotating electrical machine that has a rotor with a body made of magnetic materials, a stator surrounding the rotor; the stator has at least one armature coil, and the rotor has closed notches in the body and devices to selectively establish closed magnetic circuits passing around the armature coil of the stator; these devices include:
    permanent excitation magnets able to generate magnetic fluxes;
    excitation coils housed in the notches of the rotor to define coiled poles; said coils are able to be excited and generate magnetic flux components to counter the fluxes generated by at least some of the magnets to create defluxing;
    wherein the number Na of magnets and the number Nb of excitation coils and the arrangement of the coils and magnets in relation to each other form a plurality (Nme) of identical elementary patterns (me), wherein each elementary pattern is defined as a set of magnets and coils associated with a specific order and distributed over all or part of a contour of the rotor and wherein the plurality of identical elementary patterns are used to control the basic power of the rotating electric machine,
    wherein Na is equal to or greater than 1, Nb is equal to or greater than 1, Nine is equal to or greater than 1, and the pair Na, Nb is different than 1.1, and
    wherein each elementary pattern (me) comprises at least one reluctance pole.

2. The rotating electrical machine according to claim 1, wherein the magnets Na of the identical elementary patterns are arranged to generate a radial magnetic flux.

3. The rotating electrical machine according to claim 2, wherein the magnets in the identical elementary patterns have the same polarity.

4. The rotating electrical machine according to claim 1, wherein the coil poles in the identical elementary patterns have the same polarity.

5. The rotating electrical machine according to claim 1, wherein each elementary pattern comprises at least one coil pole and a consecutive magnet separated by at least one reluctance pole.

6. The rotating electrical machine according to claim 1, wherein the winding strands of a coil belonging to an elementary pattern are held in two adjacent notches placed between two consecutive magnets.

7. The rotating electrical machine according to claim 1 wherein several of the identical elementary patterns are associated with each other.

8. The rotating electrical machine according to claim 7, wherein there is, between at least two consecutive elementary patterns, a succession of at least one pair of North-South or South-North poles created by at least one magnet.

9. The rotating electrical machine according to claim 8, wherein the at least one magnet inserted between the at least two consecutive elementary patterns has a different polarity from at least one magnet belonging to at least one elementary pattern.

10. The rotating electrical machine according to claim 1, wherein the Nb coils are not all excited simultaneously.

11. The rotating electrical machine according to claim 1, wherein the intensity of modulation (Imod) is in an interval between −Ib and +Ib, where Ib is the maximum intensity of the magnetic flux supplied by the Nb coils.

12. The rotating electrical machine according to claim 1, wherein there is a residual magnetic flux (Fr) coming from the magnets which is not subject to the influence of the defluxing magnetic flux (Fd) produced by the excitation coils.

13. The rotating electrical machine according to claim 1, wherein the electrical machine consists of an automobile alternator.

14. The rotating electrical machine according to claim 1, wherein the electrical machine consists of an automobile alternator-starter.

15. A rotating electrical machine comprising a rotor with a body made of magnetic materials, a stator surrounding the rotor; the stator has at least one armature coil, and the rotor has closed notches in the body and devices to selectively establish closed magnetic circuits passing around the armature coil of the stator; wherein the rotating electrical machine comprises:
    permanent excitation magnets able to generate magnetic fluxes;
    excitation coils housed in the notches of the rotor to define coiled poles; said coils are able to be excited and generate magnetic flux components to counter the fluxes generated by at least some of the magnets to create defluxing;
    wherein the number Na of magnets and the number Nb of excitation coils and the arrangement of the coils and magnets in relation to each other form a plurality (Nme) of identical elementary patterns (me),
    wherein each elementary pattern is defined as a set of magnets and coils associated with a specific order and distributed over all or part of a contour of the rotor and wherein the plurality of identical elementary patterns are used to control the basic power of the rotating electric machine.
    wherein Na is equal to or greater than 1, Nb is equal to or greater than 1, Nme is equal to or greater than 1, and the pair Na, Nb is different than 1.1, and
    wherein each elementary pattern comprises at least two consecutive magnets separated by at least one reluctance pole.

16. A rotating electrical machine comprising a rotor with a body made of magnetic materials, a stator surrounding the rotor; the stator has at least one armature coil, and the rotor has closed notches in the body and devices to selectively establish closed magnetic circuits passing around the armature coil of the stator; wherein the rotating electrical machine comprises:
    permanent excitation magnets able to generate magnetic fluxes;
    excitation coils housed in the notches of the rotor to define coiled poles; said coils are able to be excited and generate magnetic flux components to counter the fluxes generated by at least some of the magnets to create defluxing;
    wherein the number Na of magnets and the number Nb of excitation coils and the arrangement of the coils and magnets in relation to each other form a plurality of identical elementary patterns (me), wherein each elementary pattern is defined as a set of magnets and coils associated with a specific order and distributed over all or part of a contour of the rotor and wherein the plurality of identical elementary patterns are used to control the basic power of the rotating electric machine, wherein Na is equal to or greater than 1, Nb is equal to or greater than 1, Nme is equal to or greater than 1, and the pair Na, Nb is different than 1.1, and wherein each elementary pattern comprises at least two consecutive coil poles separated by at least one reluctance pole.

17. A rotating electrical machine comprising a rotor with a body made of magnetic materials, a stator surrounding the rotor; the stator has at least one armature coil, and the rotor has closed notches in the body and devices to selectively establish closed magnetic circuits passing around the armature coil of the stator; wherein the rotating electrical machine comprises:

permanent excitation magnets able to generate magnetic fluxes;

excitation coils housed in the notches of the rotor to define coiled poles; said coils are able to be excited and generate magnetic flux components to counter the fluxes generated by at least some of the magnets to create defluxing;

wherein the number Na of magnets and the number Nb of excitation coils and the arrangement of the coils and magnets in relation to each other form a plurality (Nme) of identical elementary patterns (me), wherein each elementary pattern is defined as a set of magnets and coils associated with a specific order and distributed over all or part of a contour of the rotor and wherein the plurality of identical elementary patterns are used to control the basic power of the rotating electric machine, wherein Na is equal to or greater than 1, Nb is equal to or greater than 1, Nme is equal to or greater than 1, and the pair Na, Nb is different than 1.1, and wherein each elementary pattern comprises at least one coil pole and a consecutive magnet separated by at least one reluctance pole.

* * * * *